United States Patent [19]

Gerhart et al.

[11] Patent Number: 5,252,630
[45] Date of Patent: Oct. 12, 1993

[54] ANTIFOULING COATING AND METHOD FOR USING SAME

[75] Inventors: Donald J. Gerhart, Hillsborough; Dan Rittschof, Morehead City; Joseph Bonaventura, Beaufort, all of N.C.

[73] Assignee: Duke University, Durham, N.C.

[21] Appl. No.: 961,158

[22] Filed: Oct. 15, 1992

[51] Int. Cl.$^5$ .......................... C09D 5/14; C07J 43/00
[52] U.S. Cl. ........................ 523/122; 540/95
[58] Field of Search ............ 523/122; 540/95

[56] References Cited

U.S. PATENT DOCUMENTS

| | | | |
|---|---|---|---|
| 3,134,772 | 5/1964 | Kondo et al. | 260/239.57 |
| 3,687,944 | 8/1972 | Pettit et al. | 260/239.57 |
| 4,410,642 | 10/1983 | Layton et al. | 523/122 |
| 4,596,724 | 6/1986 | Lane et al. | 427/385.5 |
| 4,788,302 | 11/1988 | Costlow et al. | 549/458 |
| 4,923,894 | 5/1990 | Kanda et al. | 514/493 |
| 5,128,370 | 7/1992 | Grabley et al. | 514/461 |
| 5,154,747 | 10/1992 | Yokoi et al. | 71/67 |

FOREIGN PATENT DOCUMENTS

| | | | |
|---|---|---|---|
| 54-44018 | 4/1979 | Japan. | |
| 55-130905 | 10/1980 | Japan. | |
| 57-188509 | 11/1982 | Japan. | |
| 1519882 | 8/1978 | United Kingdom | 106/15.05 |
| 2006183A | 5/1979 | United Kingdom | 106/15.05 |

OTHER PUBLICATIONS

Sears et al., *Antifouling Agents from Marine Sponge*, Journal of Chemical Ecology, vol. 16, No. 3, 1990.
Gerhart et al., *Chemical Ecology and the Search for Marine Antifoulants*, Journal of Chemical Ecology, vol. 14, No. 10, 1988.

*Primary Examiner*—Paul R. Michl
*Assistant Examiner*—LaVonda Dewitt
*Attorney, Agent, or Firm*—Bell, Seltzer Park & Gibson

[57] ABSTRACT

A method of controlling the attachment of organisms to an underwater surface is disclosed. The method comprises contacting the organisms with a compound of Formula I

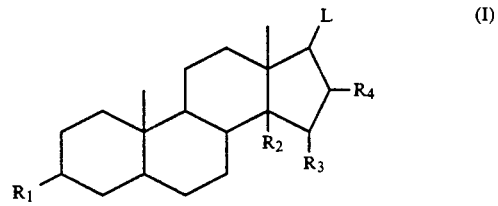

wherein $R_1$ is hydrogen, hydroxyl, $C_1$-$C_{20}$ alkyl, $C_1$-$C_{20}$ alkoxy, $C_1$-$C_{20}$ aryl, $C_1$-$C_{20}$ alkyl aryl, or carbohydrate; $R_2$ is hydrogen or hydroxyl, and $R_3$ is hydrogen, or $R_2$ and $R_3$ together form an epoxide; $R_4$ is hydrogen, hydroxyl, $C_1$-$C_4$ alkoxy, or carboxylic acid; and L is selected from the group consisting of a moiety of Formula II, a moiety of Formula III, and a moiety of Formula IV

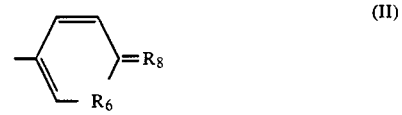

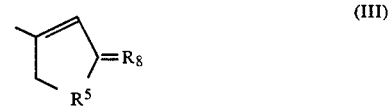

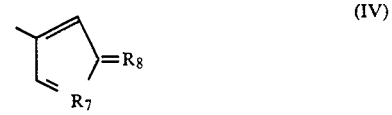

wherein $R_5$ is $CH_2$, NH, O or S, $R_6$ is $CH_2$, NH, O or S, $R_7$ is N or CH, and $R_8$ is NH or O, and wherein the compound is optionally substituted from 1 to five times with halogen, hydroxyl, $C_1$-$C_3$ alkyl, or $C_1$-$C_3$ alkoxy groups at positions 1, 2, 4, 5, 6, 7, 8, 9, 10, 11, and 12. Antifouling coatings and cementitious compositions containing a compound of Formula I are also disclosed.

19 Claims, No Drawings

ANTIFOULING COATING AND METHOD FOR USING SAME

The invention was made with Government support under Contract No. N00014-90J-1660 awarded by the Office of Naval Research. The Government has certain rights in this invention.

FIELD OF THE INVENTION

This invention relates generally to coatings used to protect underwater surfaces from settlement by aquatic organisms, and more specifically relates to the inclusion of a bufalin derivative in such a coating.

BACKGROUND OF THE INVENTION

In marine, brackish, and freshwater environments, organisms collect, settle, attach, and grow on submerged structures. Organisms which do so can include algae, fungi, microbes, and aquatic animals, such as tunicates, hydroids, bivalves, bryozoans, polychaete worms, sponges, and barnacles. Submerged structures can include the underwater surfaces of ships, docks and piers, pilings, heat exchangers, dams, piping structures, such as intake screens, and cooling towers. The presence of these organisms, known as the "fouling" of a structure, can be harmful in many respects. They can add to the weight of the structure, hamper its hydrodynamics, reduce its operating efficiency, increase susceptibility to corrosion, and degrade or even fracture the structure.

The common method of controlling the attachment of fouling organisms is by protecting the structure to be protected with a paint or coating which contains an antifouling agent. Exemplary antifouling coatings and paints are described in U.S. Pat. Nos. 4,596,724 to Lane, 4,410,642 to Layton, 4,788,302 to Costlow. Application of a coating of this type inhibits the attachment, or "settling", of the organism, by either disabling the organism or providing it with an unattractive environment upon which to settle.

Of the fouling organisms noted above, barnacles have proven to be among the most difficult to control. Typically, commercial antifouling coatings and paints include a toxic metal-containing compound such as tri-n-butyl tin (TBT), or cuprous oxide, which leaches from the coating. Although these compounds exhibit moderate success in inhibiting barnacle settlement, they degrade slowly in marine environments, and therefore are ecologically harmful. In fact, TBT is sufficiently toxic that its release rate is limited by legislation in some countries.

Some experimental non-toxic compounds have been tested with limited success in barnacle settlement inhibition. See, e.g., Gerhart et al., *J. Chem. Ecol.* 14:1905-1917 (1988), which discloses the use of pukalide, epoxypukalide, and an extract produced by the octocoral *Leptogorgia virgulata*, to inhibit barnacle settlement; Sears et al., *J. Chem. Ecol.* 16:791-799 (1990), Which discloses the use of ethyl acetate extracts of the sponge *Lissodendoryx isodictyalis* to inhibit settlement; and Japanese Patent Disclosure No. 54-44018A of Apr. 7, 1979, which discloses the use of gamma-methylenebutenolide lactone and alkyl gamma-methylenebutenolide lactone derivatives.

In view of the foregoing, it is a first object of the present invention to provide a non-toxic antifouling compound which effectively inhibits the settlement of barnacles on an underwater surface.

It is a second object of the present invention to provide an antifouling paint or coating which releases the aforementioned antifouling compound.

SUMMARY OF THE INVENTION

These and other objects are satisfied by the present invention which as a first aspect includes a method of combatting the attachment of organisms to an underwater surface. The method comprises contacting fouling organisms with a compound of Formula I

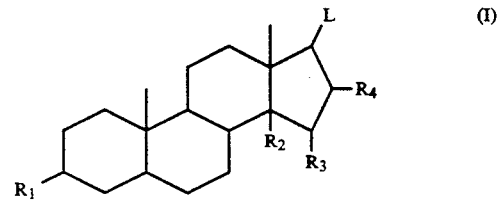

wherein $R_1$ is hydrogen, hydroxyl, $C_1$–$C_{20}$ alkyl, $C_1$–$C_{20}$ alkoxy, $C_1$–$C_{20}$ aryl, $C_1$–$C_{20}$ alkyl aryl, or carbohydrate;

$R_2$ is hydrogen or hydroxyl, and $R_3$ is hydrogen, or $R_2$ and $R_3$ together form an epoxide;

$R_4$ is hydrogen, hydroxyl, $C_1$–$C_4$ alkoxy, or $C_1$–$C_4$ carboxylic acid; and L is selected from the group consisting of a moiety of Formula II, a moiety of Formula III, and a moiety of Formula IV

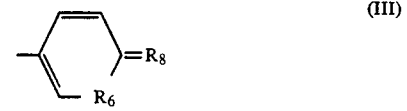

wherein $R_5$ is $CH_2$, NH, O or S, $R_6$ is $CH_2$, NH, O or S, $R_7$ is N or CH, and $R_8$ is NH or O, and wherein the compound is optionally substituted from 1 to five times with halogen, hydroxyl, $C_1$–$C_3$ alkyl, or $C_1$–$C_3$ alkoxy groups at positions 1, 2, 4, 5, 6, 7, 8, 9, 10, 11, and 12. Preferably, L is a moiety of Formula II, wherein $R_8$ is O and $R_5$ is O, or a moiety of Formula III, wherein $R_8$ is O and $R_6$ is O. The compound should be released into the aquatic environment adjacent and contacting the surface to be protected at a rate of between about 0.0001 and 1000 μg/cm²-hr.

A second aspect of the present invention is an antifouling coating comprising a compound of Formula I and a film-forming component. This coating may optionally include an additional biocide.

A third aspect of the present invention is an article coated with a coating of the type described above. Exemplary articles include boats and boat hulls, piers and pilings, buoys, offshore oil-rigging equipment and structures, and the like.

A fourth aspect of the present invention is a cementitious composition comprising a compound of Formula I and a cementitious matrix.

DETAILED DESCRIPTION OF THE INVENTION

The present invention is directed to controlling the attachment of unwanted organisms to submerged surfaces by contacting the organisms with an antifouling compound of Formula I. It has been discovered that compounds of Formula I inhibit the settlement of fouling organisms, particularly barnacles, by creating an unattractive environment for the organism; the organism senses the compound and is repelled thereby, and subsequently searches for a more appealing location on which to settle. As used herein, "settlement" refers the attachment of aquatic organisms to an underwater structure. Contacting an organism with a compound of Formula I in the area adjacent a submerged surface reduces settlement of the organism on that submerged surface.

The antifouling compound of the present invention, as illustrated in Formula I, is a steroid derivative having the dimethyl substituted perhydrocyclopentanophenanthrene ring backbone that is characteristic of steroids. As used herein, positions around the steroid backbone follow the convention known to those skilled in this art shown in Formula V.

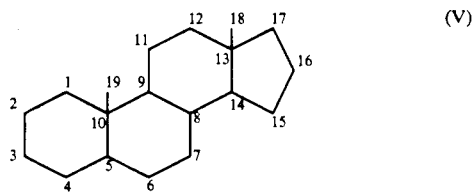
(V)

Attached to the steroid backbone at position 17 is a five-or six-membered ring which can be a five- or six-membered lactone or nitrogen- or sulfur-containing derivative thereof, or a cyclohexadiene-, cyclopentadiene-, or cyclopentene-ketone.

In the compound of Formula I, $R_1$ can be hydrogen, hydroxyl, $C_1$-$C_{20}$ alkyl, $C_1$-$C_{20}$ alkoxy, $C_1$-$C_{20}$ aryl, $C_1$-$C_{20}$ aryl alkyl, or carbohydrate. In nature, $R_1$, is often a carbohydrate containing between 1 to 5 linked monosaccharide units. Exemplary monosaccaraides include glucose, galactose, mannose, altrose, lyxose, ribose, arabinose, xylose, and allose. $R_1$ is preferably carbohydrate, hydroxyl or hydrogen; preferred monosaccharide units comprising the carbohydrate are glucose and galactose. More preferably, $R_1$ is hydroxyl.

In a compound of Formula I, $R_2$ is hydrogen or hydroxyl when $R_3$ is hydrogen. If $R_2$ is hydroxyl, it is preferred that the hydroxyl group be in the $\beta$ position. In the alternative, $R_2$ and $R_3$ can combine to form an epoxide group; it is preferred that such an epoxide group extend in the $\beta$ direction.

$R_4$ can be hydrogen, hydroxyl, $C_1$-$C_4$ alkyl, $C_1$-$C_4$ alkoxy, or $C_1$-$C_4$ carboxylic acid (i.e., the steroid is esterified to a $C_1$-$C_4$ carboxylic acid at position 16). If $R_4$ is hydroxyl, $C_1$-$C_4$ alkyl, $C_1$-$C_4$ alkoxy, or $C_1$-$C_4$ carboxylic acid, it is preferred that $R_4$ be in the $\beta$ position. Preferably, $R_4$ is hydrogen or $C_1$-$C_4$ carboxylic acid.

L can be any moiety defined by Formulas II, III, and IV. It has been discovered that an essentially flat five- or six-membered ring attached at position 17 of the steroid backbone having an electrophilic group across the ring from the attachment of the ring to the steroid backbone is a key element in the inhibition of the settlement of organisms. Thus $R_8$, which is present in Formulas II, III, and IV, can be either a ketone oxygen or a primary imine nitrogen, each of which are sufficiently electrophilic to cause settlement inhibition. $R_5$, $R_6$, and $R_7$ are moieties which allow the rings described by these formulas to take an essentially flat profile. As set forth above, $R_5$ can be O, S, $CH_2$, or NH, with O being preferred. $R_6$ can be O, S, $CH_2$, or NH, with O being preferred. $R_7$ can be N or CH. Particularly preferred moieties for L are a moiety of Formula II, wherein $R_5$ is O and $R_8$ is O, as is the case in bufalin and cinobufatalin, and a moiety of Formula III wherein $R_6$ is O and $R_8$ is O.

The compounds of Formula I may be substituted or unsubstituted from one to five times with halogens, hydroxyl, $C_1$-$C_3$ alkyl, and $C_1$-$C_3$ alkoxy groups at positions 1, 2, 4, 5, 6, 7, 8, 9, 10, 11, and 12. Preferably, the antifouling compound is unsubstituted at these positions, or is substituted with a hydroxyl group at position 5.

Particularly preferred compounds of Formula I include bufalin (3,14-dihydroxybufa-20,22 dienolide), cinobufagin (16-(acetyloxy)-14,15-epoxy-3 hydroxybufa-20,22-enolide) and cinobufatalin(16-(acetyloxy)-14,15-epoxy-3,5dihydroxybufa-20,22-enolide).

In the practice of the method of the present invention, the antifouling compound may be contacted to the organism by coating the object to be protected with a coating containing the antifouling compound, which then releases the compound into the aquatic environment immediately adjacent the external surfaces of the article, by including the antifouling compound within material formed into an aquatic article which then releases the compound, by releasing the compound directly into the aquatic environment surrounding the protected object, or by any other method wherein the compound contacts the organism prior to its attachment to the surface. As used herein, the term "contacting" means that an amount of antifouling compound sufficient to inhibit settlement of the organism on the surface of interest physically contacts the organism, whether by direct external contact, inhalation, respiration, digestion, imbibition, or any other process.

The amount of compound to be used in the method will vary depending on a number of factors, including the identity of the antifouling compound, the identity of the organism to be inhibited, and the mode of contact. In addition, the rate at which the compound is released into the surrounding aquatic environment can be a major factor in determining both the effectiveness of the method and the duration of protection. If the compound is released too rapidly, it will be exhausted quickly, and the coating must be re-applied for the surface to be protected. If on the other hand the release rate of the antifouling compound is too slow, the concentration of the compound in the aquatic environment immediately surrounding the surface to be protected may be insufficient to inhibit settlement. Preferably, the antifouling compound is released into the environment adjacent the protected surface at the rate of between about 0.0001 and 1000 $\mu g/cm^2$-hr, and more preferably is released at a rate of between about 0.01 and 100 $\mu g/cm^2$-hr.

The organisms against which a surface can be protected by the present method can be any organism which can attach to a submerged surface. Exemplary organisms include algae, including members of the phyla Chlorophyta and Phaeophyta, fungi, microbes, tunicates, including members of the class Ascidiacea, such as *Ciona intestinalis, Diplosoma listerianium,* and *Botryllus sclosseri,* members of the class Hydrozoa, including *Clava sguamata, Hydractinia echinata, Obelia geniculata,* and *Tubularia larynx,* bivalves, including *Mytilus edulis, Crassostrea virginica, Ostrea edulis, Ostrea chilensia,* and *Lasaea rubra,* bryozoans, including *Electra pilosa, Bugula neritina,* and *Bowerbankia gracilis,* polychaete worms, including *Hydroides norvegica,* sponges, and members of the class Cirripedia (barnacles), such as *Balanus amphitrite, Lepas anatifera, Balanus balanus, Balanus balanoides, Balanus hameri, Balanus crenatus, Balanus improvisus, Balanus galeatus,* and *Balanus eburneus.* In a preferred embodiment of the method, barnacles are prevented from settling on a structure.

In addition to the compound of Formula I, the method may further comprise contacting fouling organisms with other antifouling agents which may act in combination or synergistically with the compound of Formula I. Exemplary antifouling agents include: manganese ethylene bisdithiocarbamate, a coordination product of zinc ion and manganese ethylene bisdithiocarbamate; zinc ethylene bisdithiocarbamate; zinc dimethyl dithiocarbamate, 2,4,5,6-tetrachloroisophthalonitrile; 2-methylthio-4-t-butylamino-6-cyclopropylamino-S-triazine; 3-(3,4-dichlorophenyl)-1,1-dimethyl urea; N-(fluorodichloromethylthio)-phthalimide; N,N-dimethyl-N'-phenyl-(N-fluorodichloromethylthio)-sulfamide; tetramethylthiuram disulfide; 2,4,6-trichlorophenyl maleimide; zinc 2-pyridinthiol-1-oxide; copper thiocyanate; Cu-10% Ni alloy solid solution; and 4,5-dichloro-2-n-octyl-4-isothiazolin-3-one.

The invention includes as a second aspect an antifouling coating which comprises a compound of Formula I and a film-forming component. The compound of Formula I is defined as described above. The film-forming component of a coating of the present invention can be any component or combination of components which is applied easily to the surface to be protected, adheres to the submerged surface to be protected, and permits the release of the antifouling compound into the water immediately surrounding the coated surface. Clearly, different film-forming components will be preferred depending on the material comprising the underwater surface, the operation requirements of the surface, the configuration of the surface, and the antifouling compound. Exemplary film-forming components include polymer resin solutions and aqueous powder solutions, with polymer resin solutions being preferred. Exemplary polymer resins include unsaturated polyester resins formed from (a) unsaturated acids and anhydrides, such as maleic anhydride, fumaric acid, and itaconic acid; (b) saturated acids and anhydrides, such as phthalic anhydride, isophthalic anhydride, terephthalic anhydride, tetrahydrophthalic anhydride, tetrahalophthalic anhydrides, chlorendic acid, adipic acid, and sebacic acid; (c) glycols, such as ethylene glycol, 1,2 propylene glycol, dibromoneopentyl glycol, Dianol 33 ®, and Dianol 22 ®; and (d) vinyl monomers, such as styrene, vinyl toluene, chlorostyrene, bromostyrene, methylmethacrylate, and ethylene glycol dimethacrylate. Other suitable resins include vinyl ester-, vinyl acetate-, and vinyl chloride-based resins, and urethane-based resins.

The percentage of the antifouling compound of Formula I in the coating required for proper release of the compound into the aquatic environment surrounding the surface to be protected will vary depending on the identity of the antifouling compound, the identity of the film-forming component of the coating and other additives present in the coating which may affect release rate. As described above, the release rate of the antifouling compound can be a major factor in determining both the effectiveness of the method and the duration of protection. It is preferred that the coating be released into the surrounding water at a rate of between about 0.0001 and 1,000 $\mu g/cm^2$-hr; more preferably, the compound comprises between about 0.01 and 100 $\mu g/cm^2$-hr. Preferably, the antifouling compound comprises between about 0.001 and 80 percent of the coating by weight, and more preferably comprises between 0.01 and 20 percent of the coating.

Those skilled in this art will appreciate that a coating of the present invention can comprise any number of forms, including a paint, a gelcoat, a varnish, and the like. The coating can include components in addition to the antifouling coating and film-forming component which confer a desirable property, such as hardness, strength, rigidity, reduced drag, impermeability, or water resistance.

The present invention encompasses any article which contains a surface coated with a coating containing a compound of Formula I. Those articles which are particularly suitable for protection with the coating are those which, either intentionally or inadvertently, are submerged for at least the duration required for an organism to settle on a submerged object. Coated articles can comprise any material to which aquatic organisms are known to attach, such as metal, wood, concrete, polymer, and stone. Exemplary articles which may require antifouling protection include boats and boat hulls, fishing nets, fish cages, recreational equipment, such as surfboards, jet skis, and water skis, piers and pilings, buoys, off-shore oil rigging equipment, and decorative or functional stone formations.

The present invention also includes a cementitious composition which includes an antifouling compound of Formula I and a cementitious matrix. Such a composition is suitable for use in submerged structures. such as piers, pilings, and offshore oil rigging equipment and scaffolding, upon which fouling organisms tend to settle. Exemplary cementitious matrix compositions include portland cement and calcium aluminate based compositions. As those skilled in this art will appreciate, the cementitious matrix should be able to release the antifouling compound, and the antifouling compound must be present in sufficient concentration that the release rate of the compound into the surrounding aquatic environment inhibits settling of organisms on the submerged surface of an article formed from the composition. It is preferred that the antifouling compound be present in such a composition at a concentration by weight of between 0.001 and 30 percent.

The invention is now described in more detail in the following non-limiting examples. These examples are provided to more completely disclose the information to those skilled in this art, and are not intended to be construed as limiting on the invention.

EXAMPLE 1

Collection and culture of Experimental Specimens

Adult individuals of the acorn barnacle *Balanus amphritrite* Darwin were collected from the Duke University Marine Laboratory seawall in Beaufort, N.C. Collected specimens were crushed, and the nauplius stage larvae released therefrom were cultured to cyprid stage for cyprid-state assays according to the methods of Rittschof et al., *J. Exp. Mar. Biol. Ecol.* 8: 131–146 (1984).

EXAMPLE 2

Toxicity Assay for Nauplius Larvae

Toxicity assays were conducted by adding nauplius stage larvae to Falcon 50×9 mm polystyrene Petri dishes containing 5 ml of 100 kDa-filtered seawater. Experimental dishes received a dose of bufalin, cinobufatalin, TBT, digoxigenin, or digoxin. Doses receiving no test compound served as negative controls. The dishes were incubated at 28° C. under light for approximately 15 hours and in darkness for approximately 9 hours.

After incubation, the dishes were examined under a dissecting microscope to determine whether the larvae were alive or dead. Larvae which did not respond to an emission of visible light were regarded as dead. The number of dead and living larvae was counted and recorded.

EXAMPLE 3

Naupliar Toxicity Results

Data for toxicity assays performed on nauplius stage larvae is summarized in Table 1, which lists the lethal dose for each compound required to kill 50 percent of naupliar stage larvae in a sample ($LD_{50}$).

TABLE 1

| Compounds | Naupliar Toxicity ($LD_{50}$) (ng/L) |
|---|---|
| Bufalin | 27 ng/L. |
| Cinobufagin | 37 ng/L. |
| Cinobufotalin | 837 ng/L. |
| TBT Chloride | 3,400 ng/L. (est.) |
| Digoxigenin | 4,720 ng/L. |
| Digoxin | 5,450 ng/L. |

Bufalin cinobufagin and cinobufatalin were found to have much lower $LD_{50}$ values than known antifouling agents TBT, digoxigenin, and digoxin, thus indicating their promise as antifouling compounds.

EXAMPLE 4

Settlement Assays for Cyprid-Stage Larvae

Settlement assays were performed as previously described by Rittschof et al., *J. Chem. Ecol.* 11:551–563 (1985). Three-day old cyprid larvae were added to Falcon 50×9 mm polystyrene Petri dishes. Each dish contained 5 ml of 100 kDa-filtered seawater (approximately 35 ppt salinity). Certain of the dishes received a dose of an experimental compound; the compounds tested were bufalin, cinobufatalin, tri-n-butyl tin chloride, digoxigenin, and digoxin. Doses were varied in an effort to determine inhibition levels. Dishes receiving no test compound served as negative controls. The number of replicate dishes used in each assay ranged from 2 to 4, depending on larval availability. The dishes were incubated at 28° C. under light for approximately 15 hours and in darkness for approximately 9 hours.

After incubation, the dishes were examined under a dissecting microscope to determine whether larvae were still alive. The larvae were then euthanized by the addition of several drops of 10 percent formalin. The numbers of attached and unattached larvae were then counted.

Settlement was calculated as the percentage of total larvae attached to the dish. Differences in the rate of settlement for test dishes versus controls were assessed for statistical significance through the use of a G test for independence described by Sokal et al., *Biometry* (Freeman & Co., San Francisco 1981).

EXAMPLE 5

Cyprid Settlement

Data for settlement assays performed on cyprid-stage larvae is shown in Table 2, which sets forth the dose of each compound which prevents settlement of 50 percent of cyprid stage larvae in a sample ($EC_{50}$).

TABLE 2

| Compounds | Cyprid Settlement ($ED_{50}$) (pg/ml) |
|---|---|
| Bufalin | 19 ng/L. |
| Cinobufagin | 162 ng/L. |
| Cinobufotalin | 2,600 ng/L. |
| TBT Chloride | 66,000 ng/L. (est) |
| Digoxigenin | >50,000 ng/L. |
| Digoxin | 6,300 ng/L. |

Bufalin cinobufagin and cinobufatalin are seen to have much lower $EC_{50}$ values than TBT, digoxigenin, and digoxin.

The foregoing examples are illustrative of the present invention, and are not to be construed as limiting thereof. The invention is defined by the following claims, with equivalents of the claims to be included therein.

That which is claimed is:

1. An antifouling coating for an underwater surface which controls the attachment of organisms to that surface, said coating comprising (a) a compound of Formula I:

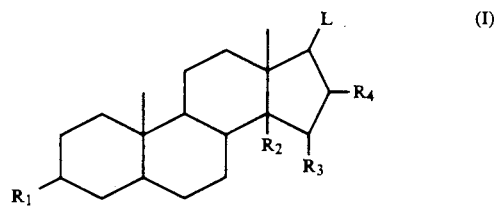

wherein $R_1$ is hydrogen, hydroxyl, $C_1$–$C_{20}$ alkyl, $C_1$–$C_{20}$ alkoxy, $C_1$–$C_{20}$ aryl, $C_1$–$C_{20}$ alkyl, aryl, or carbohydrate;

$R_2$ is hydrogen or hydroxyl, and $R_3$ is hydrogen, or $R_2$ and $R_3$ together form an epoxide;

$R_4$ is hydrogen, hydroxyl, $C_1$–$C_4$ alkoxy, or $C_1$–$C_4$ carboxylic acid; and L is selected from the group consisting of a moiety of Formula II, a moiety of Formula III, and a moiety of Formula IV

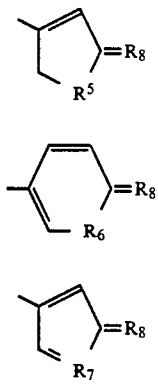

wherein $R_5$ is $CH_2$, Nh, O or S, $R_6$ is $CH_2$, CH, O or S, $R_7$ is N or CH, and $R_8$ is NH or O, and wherein said compound is optionally substituted from 1 to five times with halogen, hydroxyl, $C_1$-$C_3$ alkyl, or $C_1$-$C_3$ alkoxy groups at positions 1, 2, 4, 5, 6, 7, 8, 9, 10, 11, and 12; and (b) a film-forming component.

2. A coating according to claim 1, wherein $R_2$ and $R_3$ together form an epoxide.

3. A coating according to claim 1, wherein $R_2$ is hydroxyl.

4. A coating according to claim 1, wherein $R_1$ is a carbohydrate comprising between 1 and 4 sugar monomers.

5. A coating according to claim 1, wherein $R_8$ is O and wherein L is selected from the group consisting a moiety of Formula II wherein $R_5$ is O and a moiety of Formula III wherein $R_6$ is O.

6. A coating according to claim 1, wherein said compound comprises between about 0.001 and 80 percent of said coating by weight.

7. A coating according to claim 1, wherein said coating is a paint.

8. A coating according to claim 1, wherein said coating includes an additional antifouling compound.

9. A coating according to claim 8, wherein said additional antifouling compound is selected from the group consisting of: manganese ethylene bisdithiocarbamate, zinc ethylene bisdithiocarbamate, zinc dimethyl dithiocarbamate, 2,4,5,6tetrachloroisophthalonitrile, 2-methylthio-4-t-butylamino-6-cyclopropylamino-S-triazine, 3-(3,4-dichlorophenyl-1,1-dimethyl urea, N-(fluorodichloromethylthio)-phthalimide, N,N-dimethyl-N'-phenyl-(N-fluorodichloromethylthio)-sulfamide, tetramethylthiuram disulfide, 2,4,6-trichlorophenyl maleimide, zinc 2-pyridinthiol-1-oxide, copper thiocyanate, Cu-10% Ni alloy solid solution, and 4,5-dichloro-2-n-octyl-4-isothiazolin-3-one.

10. An article having an underwater surface to which is bonded a coating of claim 1.

11. An article according to claim 10, wherein said article is a boat.

12. An article according to claim 10, wherein said article is a piling.

13. A method of combatting the attachment of organisms to an underwater surface comprising contacting said organisms with a compound of Formula I

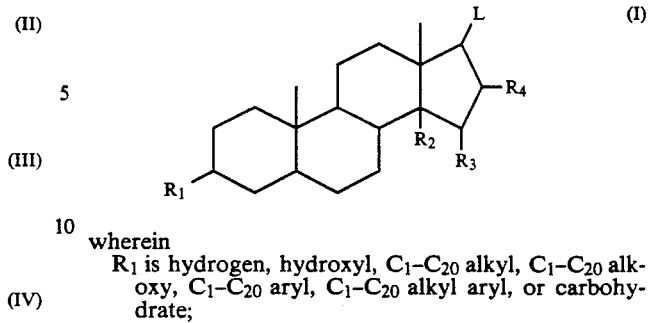

wherein
$R_1$ is hydrogen, hydroxyl, $C_1$-$C_{20}$ alkyl, $C_1$-$C_{20}$ alkoxy, $C_1$-$C_{20}$ aryl, $C_1$-$C_{20}$ alkyl aryl, or carbohydrate;
$R_2$ is hydrogen or hydroxyl, and $R_3$ is hydrogen, or $R_2$ and $R_3$ together form an epoxide;
$R_4$ is hydrogen, hydroxyl, $C_1$-$C_4$ alkoxy, or $C_1$-$C_4$ carboxylic acid; and
L is selected from the group consisting of a moiety of Formula II, a moiety of Formula III, and a moiety of Formula IV

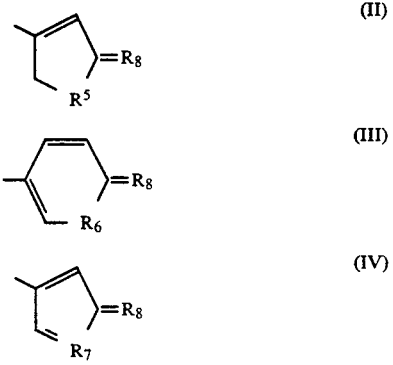

wherein $R_5$ is $CH_2$, NH, O or S, $R_6$ is $CH_2$, NH, O or S, $R_7$ is N or CH, and $R_8$ is NH or O, and wherein said compound is optionally substituted from 1 to five times with halogen, hydroxyl, $C_1$-$C_3$ alkyl, or $C_1$-$C_3$ alkoxy groups at positions 1, 2, 4, 5, 6, 7, 8, 9, 10, 11, and 12.

14. A method according to claim 13, wherein said contacting step comprising contacting members of the class Cirripedia to the compound.

15. A method according to claim 13, wherein said contacting step includes releasing the compound into a medium containing the organisms to be controlled.

16. A method according to claim 13, which comprises the further step of coating the protected structure with a composition containing a compound of Formula I prior to said contacting step.

17. A method according to claim 13, wherein said contacting step comprises releasing the compound into a medium containing the organisms to be controlled at a rate of between about 0.0001 and 100 µg cm$^2$-hr.

18. A method according to claim 13, which further comprises contacting said organisms with an additional antifouling compound.

19. A method according to claim 18, wherein said additional antifouling compound is selected from the group consisting of: manganese ethylene bisdithiocarbamate, zinc ethylene bisdithiocarbamate, zinc dimethyl dithiocarbamate, 2,4,5,6-tetrachloroisophthalonitrile, 2-methylthio-4-t-butylamino-6-cyclopropylamino-S-triazine, 3-(3,4 -dichlorophenyl)-1,1-dimethyl urea, N-(fluorodichloromethylthio)-phthalimide, N,N-dimethyl-N'-phenyl-(N-fluorodichloromethylthio)-sulfamide, tetramethylthiuram disulfide, 2,4,6-trichlorophenyl maleimide, zinc 2-pyridinthiol-1-oxide, copper thiocyanate, Cu-10% Ni alloy solid solution, and 4,5-dichloro-2-n-octyl-4-isothiazolin-3-one.

* * * * *

UNITED STATES PATENT AND TRADEMARK OFFICE
CERTIFICATE OF CORRECTION

PATENT NO. : 5,252,630

DATED : Oct. 12, 1993

INVENTOR(S) : Gerhart et al.

It is certified that error appears in the above-identified patent and that said Letters Patent is hereby corrected as shown below:

Title Page:
In the Abstract lines 1 and 2 after Formula 1 change "$c_{20}$" and insert --$C_{20}$-- in all instances Column 7, Line 11, after "Ecol." delete "8:" and insert --82--.

Signed and Sealed this

Twenty-sixth Day of April, 1994

Attest:

BRUCE LEHMAN

Attesting Officer  Commissioner of Patents and Trademarks